US011122790B2

(12) United States Patent
Szozda et al.

(10) Patent No.: US 11,122,790 B2
(45) Date of Patent: Sep. 21, 2021

(54) COLD PLASMA METHOD AND APPARATUS FOR ERADICATION OF THE TAXONOMIC CLASS INSECTA

(71) Applicant: NBS TEK LLC, Sandusky, OH (US)

(72) Inventors: Jeff Szozda, Maumee, OH (US); Carl Blazik, Sandusky, OH (US); Bill Niedzwiecki, Monclova, OH (US)

(73) Assignee: NBS TEK LLC, Sandusky, OH (US)

( * ) Notice: Subject to any disclaimer, the term of this patent is extended or adjusted under 35 U.S.C. 154(b) by 0 days.

(21) Appl. No.: 16/729,815

(22) Filed: Dec. 30, 2019

(65) Prior Publication Data

US 2021/0195885 A1    Jul. 1, 2021

(51) Int. Cl.
*A01M 3/00*    (2006.01)

(52) U.S. Cl.
CPC ......... *A01M 3/00* (2013.01); *A01M 2200/011* (2013.01)

(58) Field of Classification Search
CPC .... A01M 3/005; A01M 3/007; A01M 1/2094; A01M 5/02; A01M 1/22; A01M 1/226; A01M 1/20; A01M 1/223; A01M 3/025; A01M 7/006; A61L 2/14; A61L 2/06; H05H 2245/122; H05H 2240/20; H05H 2277/10; H05H 1/34; H05H 2001/2437; H05H 2001/2462; H05H 2001/2468; A61N 1/44; A61N 1/0476; A61N 1/322; A61N 2005/0644
USPC ................ 43/127, 125, 132.1, 139, 107, 112
See application file for complete search history.

(56) References Cited

U.S. PATENT DOCUMENTS

| 8,460,283 | B1 * | 6/2013 | Laroussi | A61B 18/042 |
| | | | | 315/111.21 |
| 9,993,282 | B2 | 6/2018 | Sheperak | |
| 2002/0182101 | A1 * | 12/2002 | Koulik | H01J 37/32321 |
| | | | | 422/4 |
| 2004/0036397 | A1 * | 2/2004 | Kim | A61L 2/14 |
| | | | | 313/231.31 |
| 2010/0130911 | A1 * | 5/2010 | Morfill | H05H 1/40 |
| | | | | 604/20 |
| 2013/0276357 | A1 * | 10/2013 | Shannon | A01N 59/00 |
| | | | | 43/132.1 |

(Continued)

FOREIGN PATENT DOCUMENTS

EP     2941955 B1 *   5/2019   ..........  A01M 1/2022

*Primary Examiner* — Peter M Poon
*Assistant Examiner* — Jeffrey R Larsen
(74) *Attorney, Agent, or Firm* — Jacob M. Ward; Ward Law Office LLC (57) ABSTRACT

A system for eradication of insects, insect larvae, and insect eggs includes an applicator, a plurality of nozzles, a gas source, and a cold plasma generator. The applicator is adapted to be moved by the user over an area to be treated. The plurality of nozzles are disposed on the applicator. The cold plasma generator is in electrical communication with a power supply. The cold plasma generator is in fluid communication with the plurality of nozzles and the gas source. The cold plasma generator is configured to generate cold plasma from the gas source and configured to expel a plurality of cold plasma plumes through the plurality of nozzles that forms a cold plasma field. The cold plasma field is generated at a power and a volumetric flow sufficient for the eradication of the insects, the insect larvae and the incents eggs from the area to be treated.

9 Claims, 5 Drawing Sheets

(56) References Cited

U.S. PATENT DOCUMENTS

2014/0013655 A1* 1/2014 Southard ............... A01M 1/22
                                                                      43/139
2015/0262804 A1* 9/2015 Martinez Jarquin ........................
                                                                      H05H 1/2406
                                                                       250/288

* cited by examiner

PROVIDING SYSTEM FOR ERADICATION OF INSECTS, INSECT LARVAE, AND INSECT EGGS

202

GENERATING COLD PLASMA FIELD WITH COLD PLASMA GENERATOR OF SYSTEM

204

MOVING APPLICATOR OF SYSTEM ADJACENT TO AREA BEING TREATED TO CAUSE COLD PLASMA FIELD TO CONTACT AND KILL INSECTS, INSECT LARVAE, AND INSECT EGGS

COLD PLASMA METHOD AND APPARATUS FOR ERADICATION OF THE TAXONOMIC CLASS INSECTA

FIELD

The present disclosure relates to insect control, more particularly, to an apparatus for eradicating insects.

BACKGROUND

Insect infestations can be a significant problem within dwellings. Insects can spread illnesses and diseases. In addition, insects can cause severe structural damage.

In particular, bed bugs have been a known problem for humanity for thousands of years. Bed bugs are small, oval, non-flying insects that belong to the insect family Cimicidae. There are over one hundred species in this family. However, two species live almost exclusively on humans—*Cimex lectularius*, found primarily in temperate areas, and *Cimex hemipterus*, which is mostly found in tropical areas.

The name "bed bug" is derived from the insect's preferred habitat of houses and especially beds or other areas where people sleep. More recently, there has been focus on the discovery of bed bugs in upscale hotels. Bed bugs, though not strictly nocturnal, are mainly active at night and are capable of feeding unnoticed on their hosts. Bed bugs can live in any area of the home and can reside in tiny cracks in furniture as well as on textiles and upholstered furniture. They do not infest the sleeping surfaces of beds as commonly as cracks and crevices associated with the bed frame, box spring, and mattress. Other sites where bed bugs often reside include curtains, edges of carpet, corners inside dressers and other furniture, cracks in wallpaper (particularly near the bed), and inside the spaces of wicker furniture, to name a few.

Bed bugs are obligatory hematophagous (bloodsucking) insects. Most species feed on humans only when other prey is unavailable. The behavior of the bed bug can be described as feed and hide. They feed quickly, usually less than about ten minutes, and then hide close to the host for a week or two before feeding again. Bed bugs are attracted to their hosts primarily by carbon dioxide, secondarily by warmth, and also by certain chemicals. A bed bug pierces the skin of its host with two hollow feeding tubes shaped like tongues. With one tube it injects its saliva, which contains anticoagulants and anesthetics, while with the other it withdraws the blood of its host. After feeding for about five minutes to ten minutes, the bug returns to its hiding place. Although bed bugs can live for a year without feeding, they normally try to feed every five to ten days. In cold weather, bed bugs can live for about a year; at temperatures more conducive to activity and feeding bed bugs live for about five months.

A number of adverse health effects may occur in humans due to having a bed bug infestation, including skin rashes, psychological effects and allergic symptoms. Bed bug bites may lead to a range of skin manifestations from no visible effects to prominent blisters. Diagnosis involves both finding the bed bugs and the occurrence of compatible symptoms. Attending to the symptoms of a bed bug infestation is the primary short-term treatment for these adverse health effects. The only method for treating a patient long term is to eliminate the insect from the patient's habitation.

Although bed bugs were largely eradicated as pests in the early 1940s in the developed world, more recently, the prevalence of bed bugs is again on the increase. The exact causes of this resurgence remain unclear; it is variously ascribed to greater foreign travel, more frequent exchange of second-hand furnishings among homes, a greater focus on control of other pests resulting in neglect of bed bug countermeasures and increasing resistance to pesticides.

Dwellings can become infested with bed bugs in a variety of ways. Bugs and eggs can be carrying into the dwelling on pets, infested items (such as furniture, luggage or clothing) brought into the dwelling, through duct work or false ceilings, by wild animals such as bats or birds, or from other sources. Bed bugs live in any articles of furniture, clothing, or bedding, so they or their eggs may be present in used furniture or clothing. They spread by crawling and may contaminate multiple rooms in a home or even multiple dwellings in apartment buildings. Bed bugs can be found singly, but often congregate once established. They usually remain close to hosts, commonly in or near beds or couches. The eggs of bed bugs are found in similar places where the bed bugs themselves are found and are attached to surfaces by a sticky substance.

Eradicating bed bugs is not an easy process, and most cases of bed bug infestation will require treatment by a pest-control expert. A variety of low-odor sprays, dusts, and aerosol insecticides have been used to eradicate bed bugs. These must be applied to all areas where the bugs are observed as well as spaces where they may crawl or hide. However, because beds and other furniture cannot readily be treated completely with insecticides, it is often necessary to discard the infested mattresses and furniture.

Pesticides that have historically been found to be effective include: pyrethroids, dichlorvos and malathion. However, the use of pesticides raises concerns of negative health effects as a result of pesticide use. For example, the carbamate insecticide propoxur is highly toxic to bed bugs, but in the United States the Environmental Protection Agency (EPA) has been reluctant to approve such an indoor use of propoxur because of its potential toxicity to children after chronic exposure. In addition, pesticides that include synthetic pyrethrins may have longer residual effectiveness towards bed bugs, but may cause eye, skin, and respiratory irritation.

Moreover, bed bug resistance to pesticides appears to be increasing dramatically. Bed bugs are developing resistance to various pesticides including DDT and organophosphates. Bed bug populations sampled across the U.S. showed a tolerance for pyrethroids several thousands of times greater than laboratory bed bugs. New York City bed bugs have been found to be 264 times more resistant to deltamethrin than Florida bed bugs due to nerve cell mutations. In addition, recent studies have shown that some bed bugs are developing resistances to common synthetic pyrethroid insecticides.

Thermal remediation has been used as an alternative to pesticide treatment of bed bugs. The three most important keys of success in thermal remediation treatment is the heat, movement of the heat, and monitoring of the heat. The thermal death point for *Cimex lectularius* is high, 45° C. or 113° F., and all stages of life may be killed by seven minutes of exposure to 46° C. or 115° F. Thus, the idea of the thermal remediation treatment is to eliminate the bed bugs through prolonged exposure of excess amount of heat ranging in temperatures of 120° F. and higher.

These systems typically use a heating element that gradually raises the temperature of the room above the thermal death point of the bed bugs. Bed bugs and other insects, however, may react to the gradual temperature increase by escaping to a different room in the habitation or by hiding in places insulated from the increased temperature such as a deep crack or crevice or inside of walls, etc. Thus, once the treatment of the room is completed, the bed bugs or other insects may return.

In addition, cold temperature treatments have also been used as an alternative to pesticide treatment of bed bugs. Typically, these systems use temperatures as low as negative 5° F. to negative 22° F. Undesirably, these treatments generally require isolating the area for extended periods which could range from 1-3 weeks for effective termination of all stages of life.

There is a continuing need for a system and method for eradicating insects that is effective even where the insect is obstructed by a household structure or material. Desirably, the process militates against harm to the household structures and materials being treated.

SUMMARY

In concordance with the instant disclosure, a system and method for eradicating insects that is effective even where the insect is obstructed by household structures and materials, and which militates against harm to said structures and materials being treated, has been surprisingly discovered.

In one embodiment, a system for eradication of insects, insect larvae, and insect eggs includes an applicator, a plurality of nozzles, a gas source, and a cold plasma generator. The applicator has a handle that is configured to be held by a user. The applicator is adapted to be moved by the user over an area to be treated. The plurality of nozzles are disposed on the applicator. The plurality of nozzles are spaced apart from the handle of the applicator. The cold plasma generator is in electrical communication with a power supply. Also, the cold plasma generator is in fluid communication with the plurality of nozzles and the gas source. The cold plasma generator is configured to generate cold plasma from the gas source. In addition, the cold plasma generator is further configured to expel a plurality of cold plasma plumes through the plurality of nozzles that forms a cold plasma field. The cold plasma field is generated at a power and a volumetric flow sufficient for the eradication of at least one of the insects, the insect larvae and the incents eggs from the area to be treated.

In another embodiment, a system for eradication of insects, insect larvae, and insect eggs includes an applicator, a plurality of nozzles, a gas source, and a cold plasma generator. The applicator has a handle that is configured to be held by a user. The applicator is adapted to be moved by the user over an area to be treated. The plurality of nozzles are disposed on the applicator. The plurality of nozzles are spaced apart from the handle of the applicator. The cold plasma generator is in electrical communication with a power supply. Also, the cold plasma generator is in fluid communication with the plurality of nozzles and the gas source. The cold plasma generator is configured to generate cold plasma from the gas source. In addition, the cold plasma generator is further configured to expel a plurality of cold plasma plumes through the plurality of nozzles that forms a cold plasma field. The cold plasma field is generated at a power and a volumetric flow sufficient for the eradication of at least one of the insects, the insect larvae and the incents eggs from the area to be treated. The power employed to generate the cold plasma field is between 10 W and about 40 W. The volumetric flow of the cold plasma plumes through the plurality of nozzles to form the cold plasma field is between 1 cfm (cubic feet per minute) and about 10 cfm. Each of the cold plasma plumes have a length between about three millimeters (e.g., 3.175 mm) to about twenty-five millimeters (e.g., 25.4 mm). The plurality of nozzles is arranged in an array. The array includes a plurality of rows of the nozzles and a plurality of columns of the nozzles. Each of the plurality of nozzles is spaced apart from the others of the plurality of nozzles by at least two and one-half millimeters (2.54 mm). The gas source is one of a compressed gas container and a pump in communication with atmospheric air. Each of the plurality of nozzles is a venturi nozzle. The venturi nozzle is a pipe having an outlet opening with a first diameter, an inlet opening having a second diameter, and a choke having a third diameter. The third diameter is less than the first diameter and the second diameter. The first diameter of the outlet opening diameter is between about 0.1 mm to about 5.0 mm In yet another embodiment, a method for eradication of insects, insect larvae, and insect eggs includes the steps of providing the system for eradication of insects, insect larvae, and insect eggs. Then, the method includes a next step of generating the cold plasma field with the cold plasma generator. Next, the method includes a step of moving the applicator adjacent to the area being treated. The cold plasma field is thereby caused to be in contact and kill at least one of the insects, the insect larvae, and the insect eggs.

Further areas of applicability will become apparent from the description provided herein. It should be understood that the description and specific examples are intended for purposes of illustration only and are not intended to limit the scope of the present disclosure.

DRAWINGS

The above, as well as other advantages of the present disclosure, will become readily apparent to those skilled in the art from the following detailed description, particularly when considered in the light of the drawings described herein.

DETAILED DESCRIPTION

The following detailed description and appended drawings describe and illustrate various embodiments of the invention. The description and drawings serve to enable one skilled in the art to make and use the invention and are not intended to limit the scope of the invention in any manner. In respect of the methods disclosed, the order of the steps presented is exemplary in nature, and thus, is not necessary or critical unless otherwise disclosed.

As used herein, the term "cold plasma" refers to a partially ionized gas comprising ions, electrons, ultraviolet photons and reactive neutrals such as radicals, excited and ground state molecules.

As used herein, the term "insect" broadly refers to insects, insect larvae, and insect eggs. In particular examples, the insects are from the Cimicidae insect family (i.e., bed bugs). However, it should be appreciated that the eradication of insects from other insect families is also contemplated and may therefore be included within the scope of this disclosure.

One suitable device and method for generating cold plasma was described in U.S. Pat. No. 9,993,282 to Sheperak, the entire disclosure of which is hereby incorporated herein by reference. The Sheperak device has a hollow electrode having a sealed end and an open end, and at least one aperture in the hollow electrode. The electrode is configured to generate an electron beam from the sealed end of the electrode. The electrode is axially disposed within a tube. The tube is configured for establishing a shaped plasma sheath for directing the electron beam formed by the electrode. The at least one aperture in the electrode permits flow of introduced gas through both the electrode and a surrounding gap formed between the electrode and the tube such that the gas flows in a laminar manner to establish a waveguide for the electron beam. A gas supply is connected to the open end of the electrode. A power supply is connected to the electrode for energization of the plasma sheath and establishment of the electron beam such that the plasma sheath contains and directs the electron beam. The power supply is configured to power the device in a power range of from about 5 W to about 30 W. Although use of the Sheperak device is described, it should be understood that other suitable devices and methods for generating cold plasma are contemplated and may also be used within the scope of the present disclosure.

As shown in FIGS. 1-9, a system 100 for eradication of at least one insect 101 includes an applicator 102, a plurality of nozzles 106, a gas source 108, and a cold plasma generator 110 with a power supply 112.

The applicator 102 is configured to be moved by a user (not shown) over an area to be treated 105. The area to be treated 105 may include common household structures and materials that are infested with the at least one insect 101. Nonlimiting examples of structures and materials include carpets, mattress ticking, sheets, cotton cloths, and other fabrics. It should be appreciated that other structures and materials may be included in the area to be treated 105.

Figure 2:
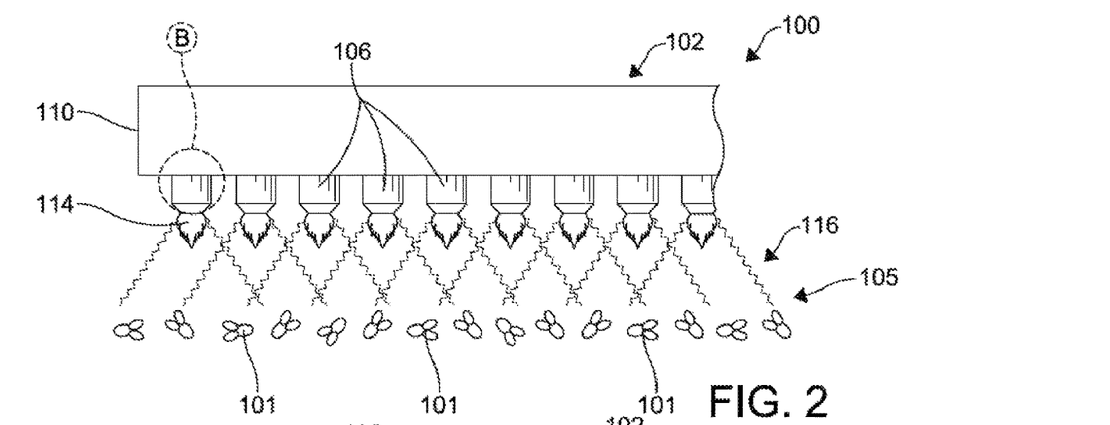
FIG. 2 is a fragmentary side elevational view of the applicator taken at call-out A in FIG. 1, and further illustrating both cold plasma plumes creating an associated cold plasma field, with the cold plasma field being applied to the insects.
Figure 3:
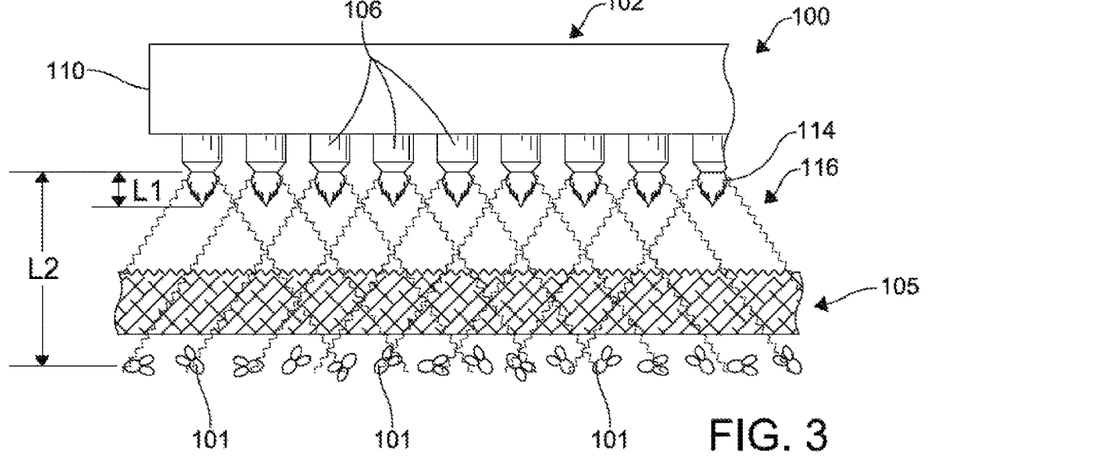
FIG. 3 is fragmentary side elevational view of the system taken at callout A in FIG. 1, and further illustrating the cold plasma field being applied to the insects through a layer of material.

As will be described in further detail below, the at least one insect 101 is eradicated where the applicator 102 is moved over it by the user, as shown in FIGS. 2-3. Desirably, this includes situations where a common household structure or material is disposed between the applicator 102 and the at least one insect 101, as shown in FIG. 3.

Figure 1:
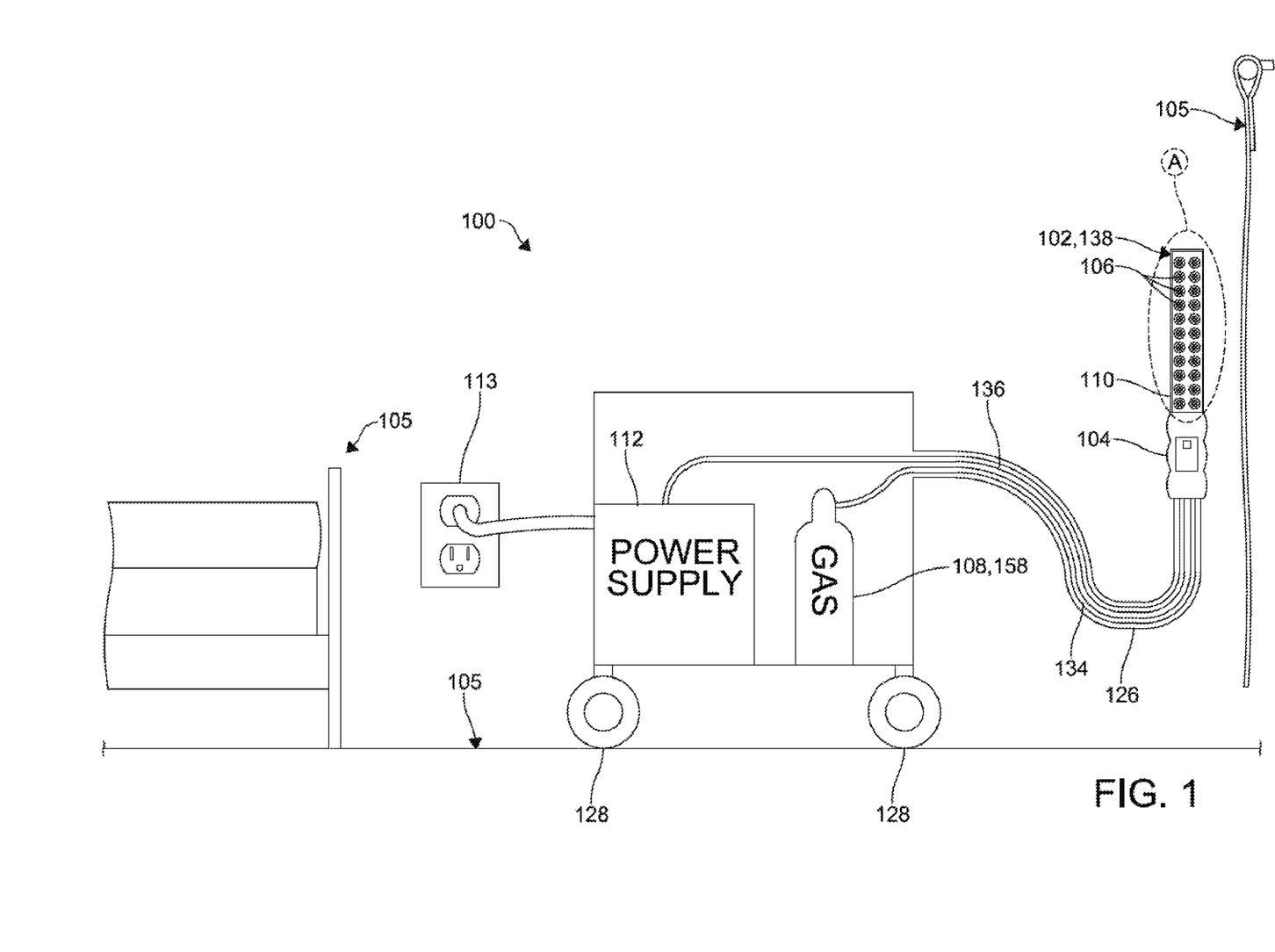
FIG. 1 is an elevational view of a system for eradication of insects, insect larvae, and insect eggs according to one embodiment of the disclosure, and further showing an applicator, a power supply, and a gas source.
Figure 8:
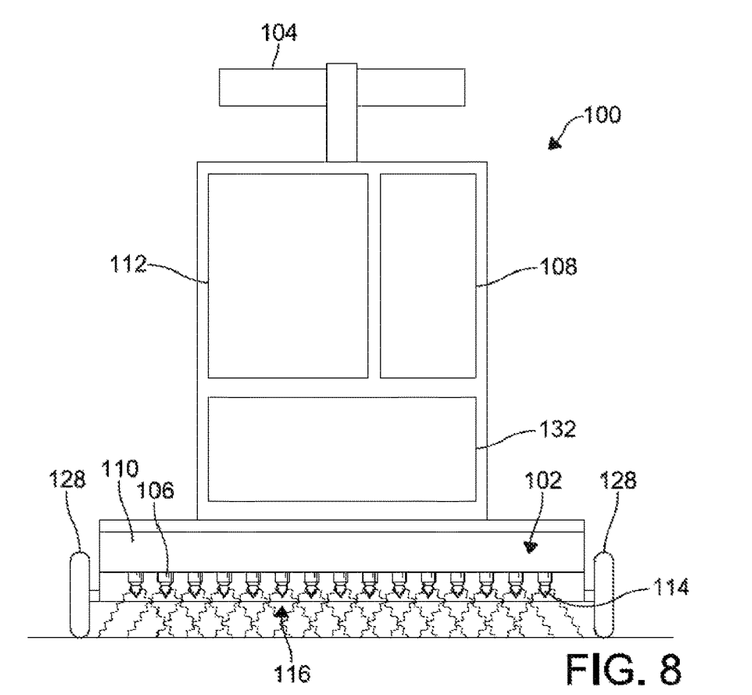
FIG. 8 is a front elevational view of the system according to yet another embodiment of the disclosure, and further showing a plurality of wheels and a suction device.
Figure 9:
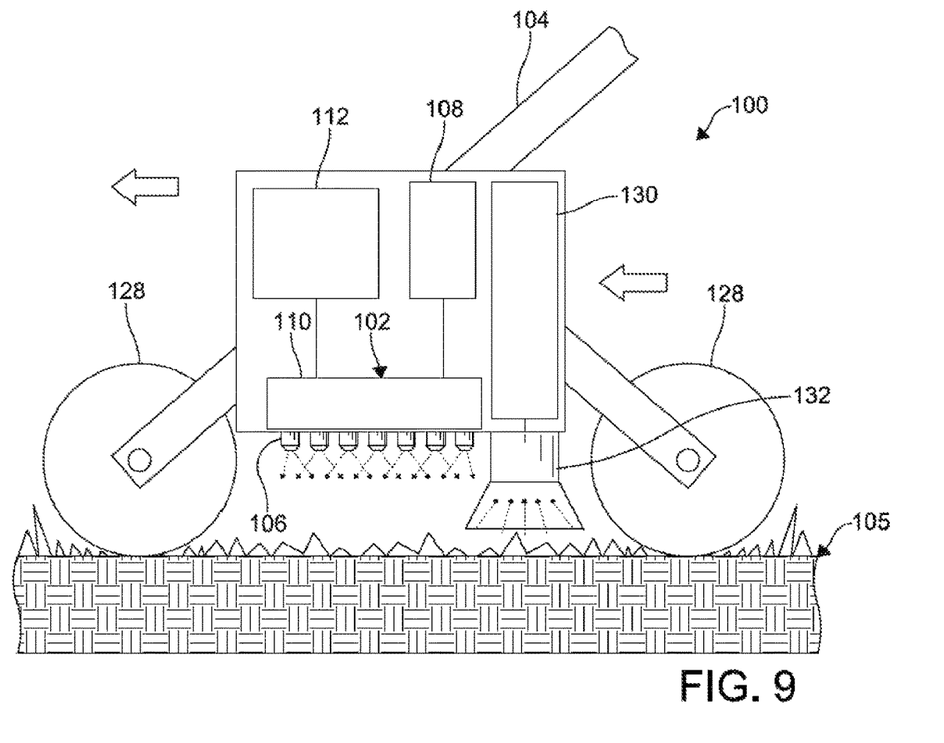
FIG. 9 is a side elevational view of the system according to an additional embodiment of the disclosure, and further showing the plurality of wheels, the suction device, and a suction aperture.

Referring now to FIGS. 1 and 8-9, the applicator 102 may also include a handle 104. The handle 104 is configured to be held by the user. Conveniently, the handle 104 provides the user with a location to easily grip the applicator 102 during use. In further examples, the handle 104 may have a gas line 134 and a power feed 136. The gas line 134 is in fluid communication with the gas source 108. The power feed 136 is in electrical communication with the power supply 112. It should be appreciated that a skilled artisan may route the gas line 134 and the power feed 136 using other methods, as desired.

In some embodiments, the applicator 102 is a wand 138, for example, as shown in FIG. 1. The wand 138 is configured to be manually waved by the user over the area to be treated 105. Conveniently, the wand 138 is directly manipulated by the hands of the user, thereby allowing the user to easily reach the area to be treated 105.

In other embodiments, the applicator 102 further includes a plurality of wheels 128, for example, as shown in FIGS. 8-9. The plurality of wheels 128 are configured to be rolled by the user over the area to be treated 105. The wheels 128 may be free rolling for manual movement or coupled to electrical motors to provide for an automated movement, as desired. Desirably, the plurality of wheels 128 permit the applicator 102 to be rolled over the area to be treated 105 instead of having to manually carry the entirety of the applicator 102. It should be appreciated that a person skilled in the art may select different numbers and types of the plurality of wheels 128 within the scope of this disclosure.

While still referring to FIGS. 8-9, the applicator 102 may further have a vacuum suction device 130 and at least one suction aperture 132. The suction device 130 is configured to cause suction to remove the at least one insect 101 from the area to be treated 105. The at least one suction aperture 132 is disposed adjacent to the plurality of nozzles 106. The at least one suction aperture 132 is configured to provide an inlet for the at least one insect 101 to be absorbed into via the suction device 130. Conveniently, the suction device 130 and the at least one suction aperture 132 permits the system 100 to not only eradicate the at least one insect 101, but also collect of the at least one insect 101 from the area to be treated 105. It should be appreciated that a person skilled in the art may scale the number of the suction aperture 132 to fulfill the requirements of a given application.

It should be appreciated that the plurality of nozzles 106 are disposed on the applicator 102. Each of the plurality of nozzles 106 is configured to expel a plurality of cold plasma plumes 114 to the area to be treated 105, for example, as shown in FIGS. 2-3 and 8. It should be appreciated that the number of the plurality of nozzles 106 is scalable by a skilled artisan, as desired.

Figure 5:
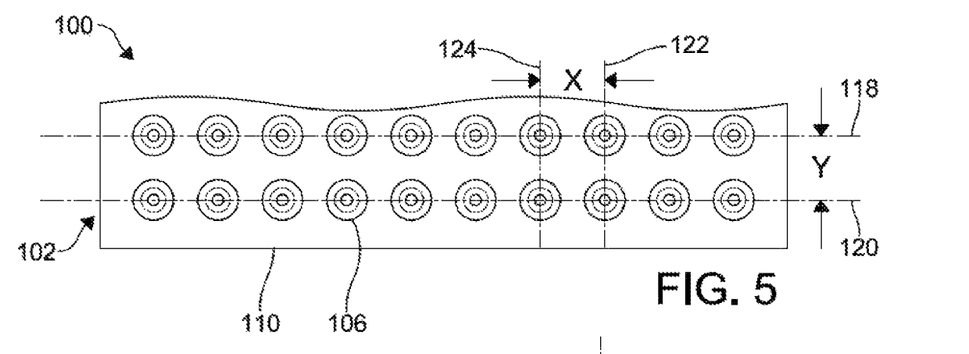
FIG. 5 is a fragmentary bottom plan view of the applicator taken at call-out A in FIG. 1, and further showing a plurality of nozzles arranged in a plurality of rows and a plurality of columns.
Figure 6:
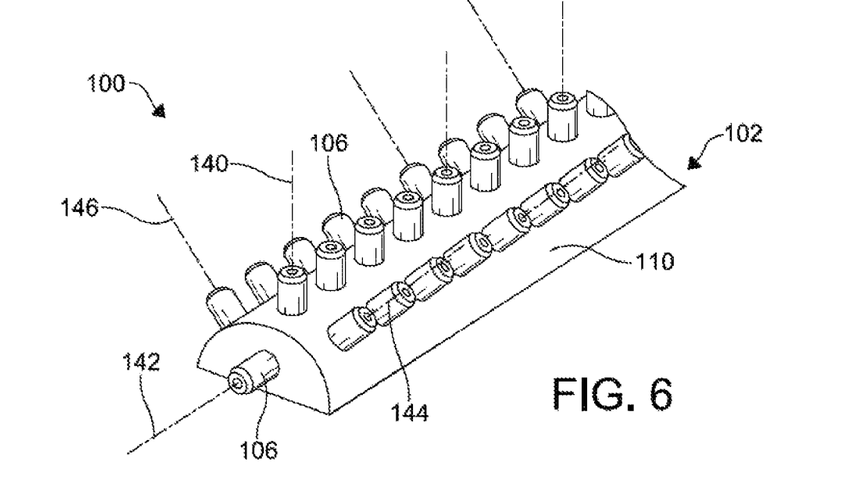
FIG. 6 is a top perspective view of the applicator according to an other embodiment of the disclosure, and further showing the plurality of nozzles arranged in an arc across a bottom surface of the applicator.
Figure 7:
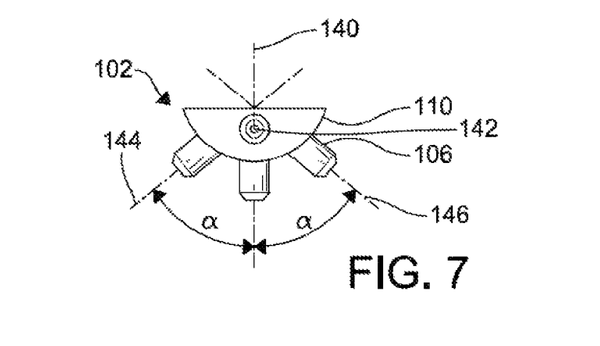
FIG. 7 is a front elevational view of the applicator shown in FIG. 6, and further showing orientations of the plurality of nozzles at complementary angles.

Now referring to FIG. 5-7, each of the plurality of nozzles 106 may be arranged in an array. The array may include a plurality of rows of the nozzles and a plurality of columns of the nozzles. Desirably, having the plurality of nozzles arranged in the array distributes the plurality of cold plasma plumes 114 more evenly across the area to be treated 105.

In a particular example, as shown in FIG. 5, the plurality of rows may be disposed along a first plane 118 and a second plane 120. A distance Y defines the distance between the first plane 118 and the second plane 120. In addition, the plurality of columns may be disposed along a third plane 122 and a fourth plane 124. A distance X defines the distance between the third plane 122 and the fourth plane 124.

In some instances, the distance Y and the distance X are not the same. In more particular instances, the distance Y and the distance X are the same. In most particular instances, the distance X and the distance Y is at least two and one-half millimeters (2.54 mm). Although this distance Y and distance X has been shown to be useful, one skilled in the art may select different distances for the distance Y and the distance X, as desired.

In other embodiments, as shown in FIGS. 6-7, the plurality of nozzles 106 are disposed along a vertical plane 140, a horizontal plane 142, a first adjacent plane 144, and a second adjacent plane 146. The vertical plane 140 is oriented orthogonal to the horizontal plane 142. The first adjacent plane 144 and the second adjacent plane 146 is oriented traverse to the vertical plane 140. The first adjacent plane 146 and the second adjacent plane 146 may define complementary angles α. The angles α may be selected so as to provide a desired zone of coverage by the skilled artisan. The angles α may particularly be between about 5 degrees and 90 degrees, and more particularly between about 25 degrees and about 65 degrees, and most particularly about 45 degrees, as non-limiting examples. Desirably, this configuration distributes the plurality of cold plasma plumes 114 across a greater area during the treatment process. It should be appreciated that other configurations may be employed by a skilled artisan, within the scope of this disclosure.

Figure 4:
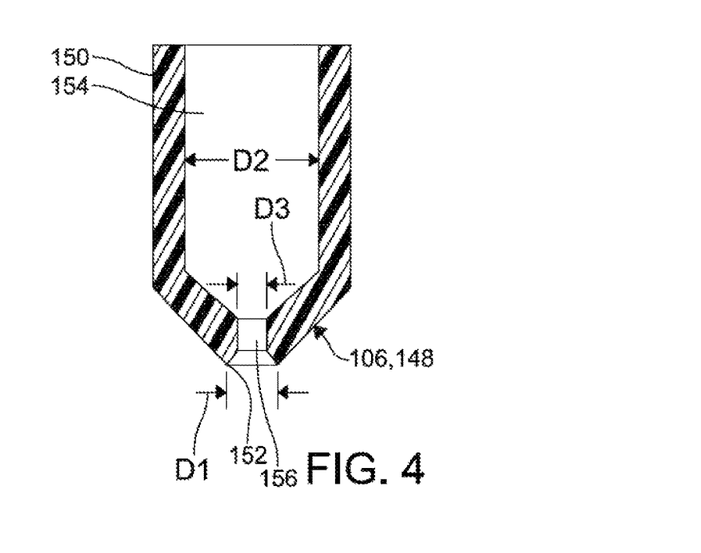
FIG. 4 is a cross-sectional side elevational view of a nozzle taken at the call-out B in FIG. 2, and further showing a pipe with an inlet opening, an outlet opening, and a choke.

With reference to FIGS. 3 and 4, each of the plurality of nozzles 126 may be a venturi nozzle 148. Without being bound to a particular theory, it is believed that the venturi nozzle 148 facilities a longer plume length, defined by a distance L1, for each of the plurality of cold plasma plumes 114. In specific examples, the distance L1 is between three millimeters (e.g., 3.175 mm) and twenty-five millimeters (e.g., 25.4 mm). In more specific examples, the distance L1 is about twelve and one-half millimeters (e.g., 12.7 mm). Although this distance L1 has been shown to be useful, one skilled in the art may select different distances for the distance L1, as desired.

While still referring to FIG. 4, the venturi nozzle 148 may be a pipe 150 that includes an outlet opening 152 with a first diameter D1, an inlet opening 154 with a second diameter D2, and a choke 156 with a third diameter D3. The third diameter D3 is less than the first diameter D1 and the second diameter D2. Without being bound to a particular theory, it is believed that the venturi nozzle 148 having this particular configuration of diameters D1, D2, and D3 facilities a greater length for the distance L1 via the choke 156 with the third dimeter D3.

In specific examples, the first diameter D1 of the outlet opening 152 is between one-tenth of a millimeter (0.1 mm) and about five millimeters (5 mm). In more specific examples, the first diameter D1 of the outlet opening 152 is about two millimeters (2 mm). While this first diameter D1 has shown to be useful, a person skilled in the art may select other dimension, as desired.

The gas source 108 is configured to supply the cold plasma generator 110 to generate cold plasma, as shown in FIG. 1. The gas source 108 may be one of a compressed gas container 158 and a pump (not shown). In some examples, the compressed gas container 158 holds one of helium and argon as gas. Desirably, the helium or argon are used to generate cold plasma. It should be appreciated that a person skilled in the art may select other gasses for the compressed gas container 158, as long as they are capable of producing cold plasma.

In the example of the pump as the gas source 108, the pump may be in communication with atmospheric air, which in turn is used to generate the cold plasma. One skilled in the art may select suitable types of air pumps for use with the system 100, as desired.

In further examples, an elongate flexible hose 126 is disposed between the gas source 108 and the cold plasma generator 110, for example, as shown in FIG. 1. The elongate flexible hose 126 may be a rubber hose, for example, although other suitable types of materials and configurations for the hose 126 may also be employed. Conveniently, this allows the user to use the cold plasma generator 110 at a distance away from the gas source 108, with sufficient flexibility for moving the applicator 102 to desired areas to be treated.

While still referencing FIG. 1, the plurality of wheels 128 may be disposed beneath the gas source 108 to allow gas source 108 be rolled behind the applicator 102. Conveniently, the plurality of wheels 128 permits the gas source 108 to be easily moved to the area to be treated 105. It should be appreciated that a person skilled in the art may select different numbers of the plurality of the plurality of wheels 128 within the scope of this disclosure.

The cold plasma generator 110 is in electrical communication with the power supply 112, as shown in FIG. 1. The power supply 112 is configured to provide power output that is used by the cold plasma generator 110 to generate the cold plasma 142. In some instances, the power supply 112 is connected to an external power source 113, such as a power outlet. In other instances, the power supply 112 may include a battery or other form of electrical power storage.

In particular examples, the power supply 112 has a power output rating between ten watts (10 W) and forty watts (40 W). In addition, the power supply 112 has a voltage rating between 100 volts (100 V) to 230 volts (230 V). In most particular examples, the power supply 112 has a power output rating of about twenty-five watts (25 W) and a voltage rating of 110 volts (110 V). One skilled in the art may select other suitable power output ratings and other suitable voltage ratings within the scope of the present disclosure.

The cold plasma generator 110 is configured to generate cold plasma using the gas source 108 and the power supply 112, thereby also expelling the plurality of cold plasma plumes 114 through the plurality of nozzles 106, as shown in FIGS. 2-3 and 8. As mentioned previously, the cold plasma generator may generate cold plasma using the methods described in U.S. Pat. No. 9,993,282 to Sheperak or other suitable methods described as known in in the art.

Desirably, the plurality of cold plasma plumes 114 has a plume temperature that is below the autoignition temperature or kindling point of the common household structures and materials, like cotton or wool, in the area to be treated 105, while still being capable of eradicating the at least one insect 101. This effectively permits the user to dispose the applicator adjacent to the common household structures and materials in the area to be treated 105 without the concern of having the materials and structures ignite, while still eradicating the at least one insect 101.

In specific examples, the plume temperature of the plurality of cold plasma plumes 114 is between about seventy degrees Fahrenheit (70° F.) and about 120 degrees Fahrenheit (120° F.). In more specific examples, the plume temperature of the plurality of cold plasma plumes 114 is about ninety-five degrees Fahrenheit (95° F.). While this plume temperature has been shown to be useful, it should be appreciated that plume temperature is scalable by a skilled artisan, as desired.

Now referencing FIGS. 2-3 and 8, the plurality of cold plasma plumes 114 form a cold plasma field 116. The cold plasma field 116 encompasses not only the area adjacent to the distance L1, but also an area extending outwardly from the distance L1, defined by a distance L2 (shown in FIG. 3). This permits the cold plasma field 116 to penetrate the common household structures and materials in the area to be treated 105.

Conveniently, the cold plasma field 116 can be utilized to eradicate the at least one insect 101, even where the common household structures and materials are between the at least one insect 101 and the applicator 102, as shown in FIG. 3. In other words, it has been surprisingly found that the at least one insect 101 does not need to be contacted directly by the cold plasma plume 114 in order to be killed, and instead the cold plasma field 116 that extends beyond the cold plasma plume 114 is sufficient for the task.

The cold plasma field 116 is generated at a volumetric flow sufficient to eradicate the at least one insect 101. In particular examples, the volumetric flow of the plurality of cold plasma plumes 114 through the plurality of nozzles 106 to form the cold plasma field 116 is between one cubic foot per minute (1 cfm) and ten cubic feet per minute (10 cfm). In more particular examples, the volumetric flow is about five cubic feet per minute (5 cfm). It should be appreciated that a skilled artisan may adjust the volumetric flow for a given application.

Without being bound to a particular belief, it is believed that a lethal combination of at least one of the charged particles, the free radicals, the UV radiation of the cold plasma field 116, the volumetric flow of the cold plasma field 116, and the plume temperature of the plurality of cold plasma plumes 114 is capable of eradicating the at least one insect 101. It should be appreciated that the at least one insect may be eradicated immediately upon contact with the cold plasma.

Figure 10:
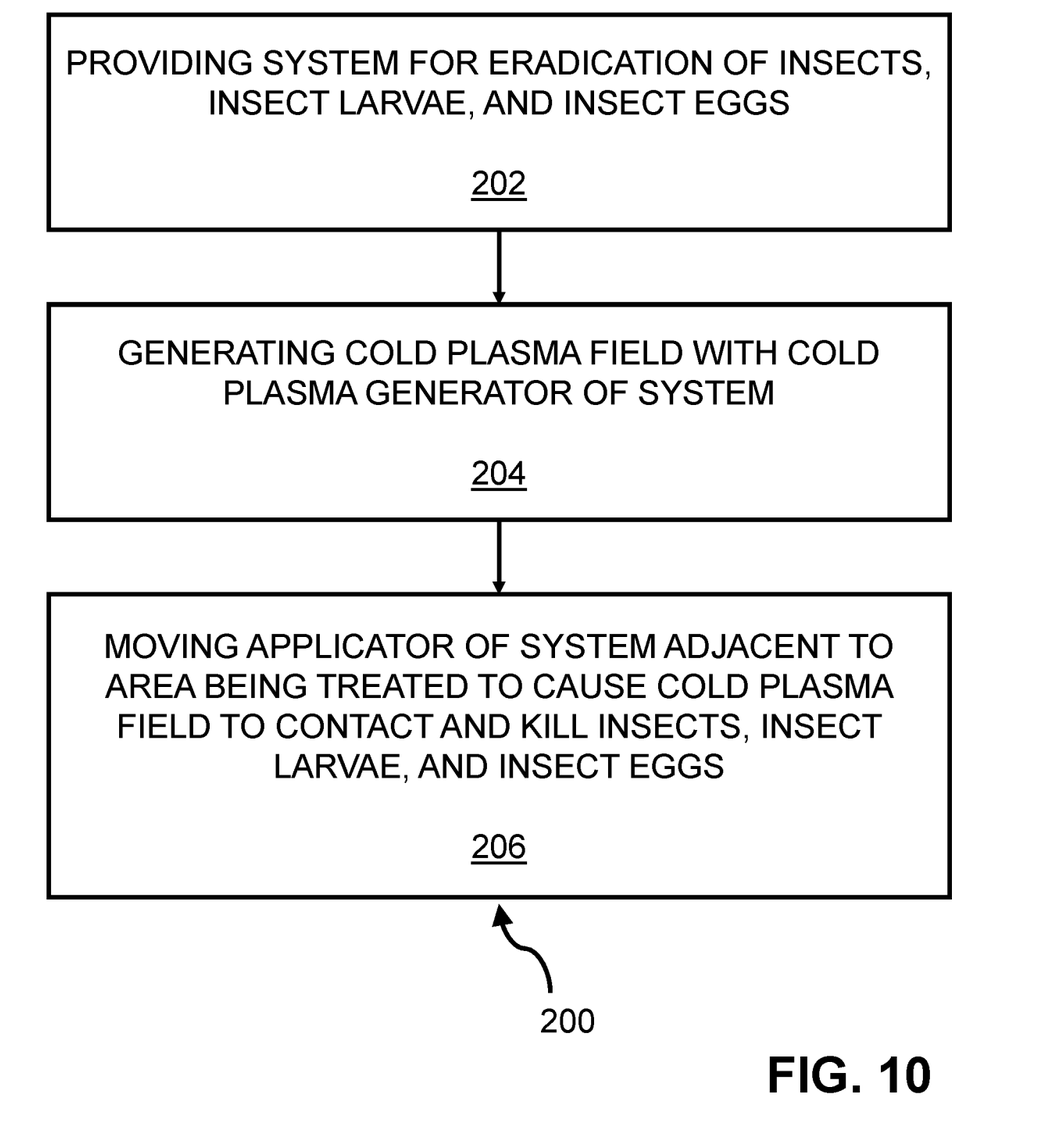
FIG. 10 is a flowchart illustrating a method for eradication of insects, insect larvae, and insect eggs according to one embodiment of the present disclosure.

Referring now to FIG. 10, a method 200 for eradication of the at least one insect 101 is shown. The method 200 includes a step 202 of providing the system 100. Next, the cold plasma generator 110 generates the cold plasma field 116, in a step 204. As mentioned above, the cold plasma generator 110 generates the cold plasma field 116 using the gas source 108 and the power supply 112, as shown in FIG. 1.

While still referring to FIG. 10, the applicator 102 is then moved adjacent to the area to be treated 105, in a step 206. Where the applicator 102 is moved adjacent to the area to be treated 105, the cold plasma field 116 is caused to contact and eradicate the at least one insect 101, shown in FIGS. 2-3.

Desirably, the applicator 102 is safe to use on the common household structures and materials in the area to be treated 105, such as wool and cotton. This is because the plume temperature of the plurality of cold plasma plumes 114 is below the kindling point of such common household materials and structures.

In addition, and as mentioned previously, the cold plasma field 116 can pierce through the common household structures and materials in the area to be treated 105, as shown in FIG. 3. Advantageously, this permits a user to eradicate the at least one insect 101, even where the common household structures and materials are between the at least one insect 101 and the applicator 102.

The following examples are presented for the purposes of illustrating the invention.

EXPERIMENTAL

A test of the system 100 and the method 200 was conducted to determine if the cold plasma field 116 was effective in eradicating adult bed bugs, as shown below in TABLE 1. The test was conducted with the gas source 108 having a gas flow between five cubic feet per minute (5 cfm) and ten cubic feet per minute (10 cfm). Also, the power supply 112 had a power rating between twenty-five watts (25 W) and thirty-five (35 W). In addition, the venturi nozzle 148 was a distance away from the adult bed bugs. This distance was between three centimeters (3 cm) to twenty-five millimeters (25 mm).

TABLE 1

| Test Number | Material | Results |
| --- | --- | --- |
| 1 | Carpet | Killed |
| 2 | Through cotton | Killed |
| 3 | Mattress ticking | Killed |
| 4 | Through glass | Killed |
| 5 | Through glass tube | Killed |
| 6 | Through plastic tube | Killed |
| 7 | Through carpet | Killed |
| 8 | Through mattress ticking | Killed |

As shown in TABLE 1, the cold plasma field 116 with the venturi nozzle 148 was effective at killing bed bugs immediately following treatment, more specifically, none of bed bugs survived the exposure. Advantageously, the cold plasma field 116 was able to kill the bed bugs through several different materials. In addition, the cold plasma did not ignite the different materials.

Another test of the system 100 and method 200 was conducted to determine how effective the cold plasma field 116 was at killing bed bug eggs, as shown below in TABLE 2. The beg bug eggs were treated with the cold plasma field 116, and then subsequently checked to determine how many still were able to hatch.

TABLE 2

| Treatment Type | Number of eggs | Number of eggs hatched |
| --- | --- | --- |
| Control | 18 | 17 |
| Cold plasma | 16 | 0 |
| Cold plasma | 7 | 0 |
| Cold plasma | 17 | 0 |
| Cold plasma | 13 | 1 |

With reference to TABLE 2, the cold plasma field 116 was very effective at preventing the bed bugs eggs from hatching. Only one (1) out of fifty-three (53) eggs were able to still hatch. Desirably, this demonstrates that the cold plasma field 116 is not only useful at destroying adult bed bugs, but also useful at preventing beg bugs from hatching.

Advantageously, the system 100 and method 200 eradicates the at least one insect 101, even where the common household structures and materials are disposed between the at least insect 101 and the applicator 102. In addition, and desirably, the plurality of cold plasma plumes 114 and the associated cold plasma field 116 do not ignite the common household structures and materials in the area to be treated 105, thereby militating against risk of harm to humans and pets.

While certain representative embodiments and details have been shown for purposes of illustrating the invention, it will be apparent to those skilled in the art that various changes may be made without departing from the scope of the disclosure, which is further described in the following appended claims.

What is claimed is:

1. A system for eradication of insects, insect larvae, and insect eggs, comprising:
    an applicator having a top surface, a bottom surface disposed opposite the top surface, a side surface disposed between the top surface and the bottom surface, and a handle configured to be held by a user, the applicator adapted to be moved by the user over an area to be treated;
    a plurality of nozzles disposed on and extending outwardly from the bottom surface of the applicator, the plurality of nozzles spaced apart from the handle of the applicator and arranged in an array including a plurality of rows of the nozzles and a plurality of columns of the nozzles, the plurality of columns defining multiple radial planes, the plurality of nozzles not disposed on the top surface of the applicator;
    a side nozzle disposed on and extending outwardly from the side surface of the applicator and oriented orthogonally in comparison to the plurality of nozzles;
    a gas source; and
    a cold plasma generator in electrical communication with a power supply, and in fluid communication with the plurality of nozzles and the gas source, the cold plasma generator configured to generate cold plasma from the gas source and to expel a plurality of cold plasma plumes through the plurality of nozzles that combine to form a cold plasma field, the cold plasma field generated at a power and a volumetric flow sufficient for the eradication of the insects from the area to be treated, wherein the power employed to generate the cold plasma field is between 10 W and 40 W, the volumetric flow of the cold plasma plumes through the plurality of nozzles to form the cold plasma field is between 1 cfm and 10 cfm, each of the cold plasma plumes has a length between 3 mm and 25 mm, the plurality of nozzles is arranged in an arc across the bottom surface of the applicator, each of the plurality of nozzles is spaced apart from others of the plurality of nozzles by at least 2.5 mm, the gas source is one of a compressed gas container and pump in communication with atmospheric air, each of the plurality of nozzles and the side nozzle is a venturi nozzle, the venturi nozzle is a pipe having an outlet opening with a first diameter, an inlet opening with a second diameter, and a choke having a third diameter, the third diameter less than the first diameter and the second diameter, and the first diameter of the outlet opening diameter is between 0.1 mm and 5.0 mm.

2. The system of claim 1, wherein the compressed gas container holds one of helium and argon as gas used to generate the cold plasma.

3. The system of claim 2, wherein the compressed gas container has wheels and is configured to be rolled behind the applicator.

4. The system of claim 3, wherein the atmospheric air is used to generate the cold plasma.

5. The system of claim 1, wherein the applicator is a wand configured to be manually waved by the user over the area to be treated.

6. The system of claim 1, wherein the power supply is one of a 120 V and a 230 V power supply.

7. The system of claim 1, wherein a temperature of the cold plasma plumes is between 70° F. and 120° F.

8. A method for eradication of insects, insect larvae, and insect eggs, the method comprising the steps of:
    providing an applicator having a top surface, a bottom surface disposed opposite the top surface, a side surface disposed between the top surface and the bottom surface, and a handle configured to be held by a user, the applicator adapted to be moved by the user over an area to be treated, a plurality of nozzles disposed on and extending outwardly from the bottom surface of the applicator, the plurality of nozzles spaced apart from the handle of the applicator and arranged in an array including a plurality of rows of the nozzles and a plurality of columns of the nozzles, the plurality of columns defining multiple radial planes, the plurality of nozzles not disposed on the top surface of the applicator, a side nozzle disposed on and extending outwardly from the side surface of the applicator and oriented orthogonally in comparison to the plurality of nozzles, a gas source, and a cold plasma generator in electrical communication with a power supply, and in fluid communication with the plurality of nozzles and the gas source, the cold plasma generator configured to generate cold plasma from the gas source and to expel a plurality of cold plasma plumes through the plurality of nozzles that combine to form a cold plasma field, the cold plasma field generated at a power and a volumetric flow sufficient for the eradication of the insects from the area to be treated, wherein the power employed to generate the cold plasma field is between 10 W and 40 W, the volumetric flow of the cold plasma plumes through the plurality of nozzles to form the cold plasma field is between 1 cfm and 10 cfm, each of the cold plasma plumes has a length between 3 mm and 25 mm, the plurality of nozzles is arranged in an arc across the bottom surface of the applicator, each of the plurality of nozzles is spaced apart from others of the plurality of nozzles by at least 2.5 mm, the gas source is one of a compressed gas container and pump in communication with atmospheric air, each of the plurality of nozzles and the side nozzle is a venturi nozzle, the venturi nozzle is a pipe having an outlet opening with a first diameter, an inlet opening with a second diameter, and a choke having a third diameter, the third diameter less than the first diameter and the second diameter, and the first diameter of the outlet opening diameter is between 0.1 mm and 5.0 mm;
    generating the cold plasma field with the cold plasma generator; and
    moving the applicator adjacent the area to be treated, whereby the cold plasma field is caused to contact and kill at least one of the insects, the insect larvae, and the insect eggs.

9. The method of claim 8, wherein the area to be treated is disposed beneath a layer of material, and the applicator is moved above the layer of material, whereby the cold plasma field extends to beneath the layer of material.

* * * * *